Nov. 21, 1950     J. W. GRAY     2,530,428
ELECTRICAL INDICATOR PLOTTING
BOARD FOR LORAN NAVIGATION

Filed Nov. 29, 1945     2 Sheets-Sheet 1

INVENTOR
JOHN W. GRAY

BY

ATTORNEY

Nov. 21, 1950

J. W. GRAY
ELECTRICAL INDICATOR PLOTTING
BOARD FOR LORAN NAVIGATION 2,530,428

Filed Nov. 29, 1945

INVENTOR
JOHN W. GRAY

By M. O. Hayes

ATTORNEY

Patented Nov. 21, 1950

2,530,428

UNITED STATES PATENT OFFICE 2,530,428

ELECTRICAL INDICATOR PLOTTING BOARD
FOR LORAN NAVIGATION

John W. Gray, Cambridge, Mass., assignor, by mesne assignments, to the United States of America as represented by the Secretary of the Navy Application November 29, 1945, Serial No. 631,748

4 Claims. (Cl. 346—33)

This invention relates to apparatus for recording the track of a ship or other moving object, and more particularly, to apparatus for recording such a track in response to the adjustment of two long range navigation receivers.

In patent application, Serial No. 599,163, filed June 13, 1945, of J. A. Pierce, D. E. Kerr, and J. C. Street is disclosed a long range navigation system which enables a navigator to locate himself on the surface of the earth. This system comprises broadly two pairs of spaced pulse transmitters, one transmitter of each pair having though not necessarily the same location, and a receiver for the transmitter pulses with the necessary timing and indicating equipment at the point to be located. The difference in arrival time of corresponding pulses from each pair of transmitters is measured. With this information and information as to the time relation of the corresponding pulses from each pair of transmitters, a location may be established along two spherical hyperbolas having their foci at respective pairs of transmitters. The intersection of these hyperbolas will fix the position of the receiver.

In practice, charts of the area of interest are prepared having the family of spherical hyperbolas plotted thereon corresponding to each pair of transmitters. The hyperbolas are ordinarily chosen to correspond to a time difference in even hundred microseconds as measured thereon, and thus the spacing between adjacent hyperbolas of a family will correspond to an incremental time delay of 100 microseconds. Using these charts, the navigator at the receiver has only to measure the arrival time difference of the corresponding pulses from each pair of transmitters, and then determine the receiver position by interpolating the distance between the two adjacent hyperbolas of each family nearest to the measured arrival time difference for that family. At times whose intervals are determined by the speed of the ship measurements may be taken, and locations corresponding thereto determined on the charts to permit a track of the ship to be plotted thereon. While this procedure is routine, there will obviously be some delay between the time of taking the measurements and the determination of the position. In relatively slow moving ships, such as water craft, this delay will ordinarily be of little importance. However, in fast moving ships such as aircraft this delay may amount to several miles of distance travelled, and where it is necessary to accurately determine the position for bombing, a correction will be necessary.

Long range navigation receivers as disclosed in the above-mentioned application, have a 1000 microsecond delay multivibrator in the path timing the sweep of the pulse from the control or "master" transmitter pulse, and an adjustable delay multivibrator circuit in the path timing the sweep for the controlled or "slave" transmitter pulse. This circuit comprises a coarse delay multivibrator having a range of 1000 to 11,000 microseconds adjustable in steps of 500 microseconds and a fine delay multivibrator adjustable over a range of 200 to 700 microseconds. A circuit diagram of the coarse multivibrator is illustrated in Fig. 7 and its operation disclosed on pages 20-22 of the above-mentioned copending application Serial No. 599,163. The fine delay multivibrator of the long range navigation system is not disclosed in detail in said copending application, but its operation will be outlined hereinbelow. The circuit multivibrators have their delays adjusted by potentiometers to time the sweeps for the respective pulses from the "master" and "slave" stations to permit these pulses to be superimposed on the visual indicators. Thus, the voltages applied to the circuit multivibrators to control their delay will be an indication of the measured arrival time delay of the "master" and "slave" transmitter pulses.

It is accordingly an object of this invention to provide apparatus for instantaneously and automatically recording the track of a ship or other moving object in response to the adjustment of two long range navigation receivers.

It is a further object of this invention to provide a plotting board for instantaneously and automatically recording the track of a ship or other moving object in response to voltages fed to said board.

Other and further objects will appear during the following description together with the accompanying drawing, where:

Figure 1:
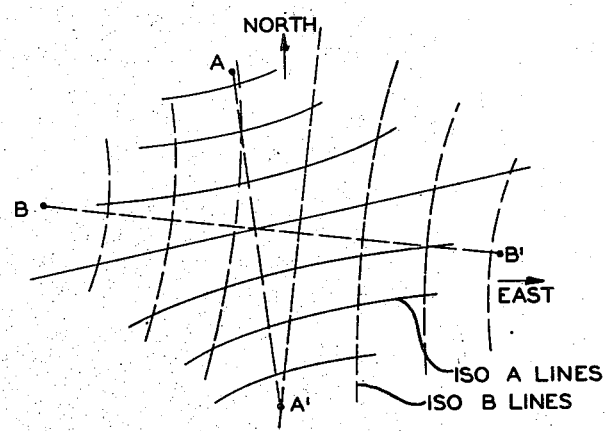
Figs. 1 and 2 are diagrams useful in explaining the principles of the invention.
Figure 2:
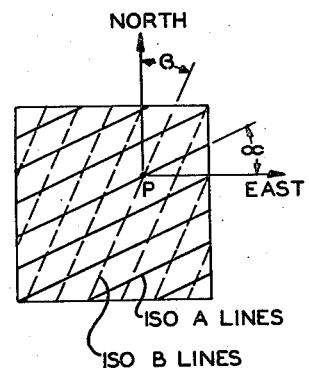

Fig. 1 discloses a long range navigation chart of a given area. A and A' represent one pair of pulse transmitters, and B and B' represent another pair. The families of spherical hyperbolas, known as Iso lines, corresponding to each pair of transmitters are plotted thereon, and indicated as Iso A lines and Iso B lines. Taking a small enough area, for instance that comprising a map 50 miles square, it can be assumed that each family of Iso lines will be straight and parallel to each other. An area of this order of magnitude is disclosed in Fig. 2. For any point on this map, there will be corresponding voltages applied to the multivibrator circuits in the A—A' and B—B' receiver indicator channels, which may be designated as $E_A$ and $E_B$ for a point P on the map. A variation in $E_A$ will correspond to a change in position along the Iso B line passing through point P, while a variation in $E_B$ will correspond to a change in position along the Iso A line passing through point P. Let $\alpha$ be the angle that the Iso A line at point P makes with the east or $x$ coordinate, and let $\beta$ be the angle that the Iso B line makes with the north or $y$ coordinate. Further, let $a$ be the inches of movement on the Iso B line per volt change in $E_A$ and $b$ be the inches of movement on the Iso A line per volt change in $E_B$, a positive value indicating a direction toward the master station. If the multivibrator circuits are linear with respect to control voltages and the Iso lines are straight over the range of interest, which are both good assumptions, the following equations hold for the north and east increments of movement, $\Delta y$ and $\Delta x$, corresponding to any given voltage increments, $\Delta E_A$ and $\Delta E_B$:

$$\Delta y = a \cos \beta \Delta E_A + b \sin \alpha \Delta E_B$$
$$\Delta x = a \sin \beta \Delta E_A + b \cos \alpha \Delta E_B$$

For a given map $a$, $b$, $\alpha$, and $\beta$ are fixed. Accordingly, $\Delta x$ and $\Delta y$ depend only on $\Delta E_A$ and $\Delta E_B$ combined in a fixed proportion depending on the values of $a$, $b$, $\alpha$, and $\beta$. It is to be noted that for the above example, the first quadrant was chosen, but the relationships also hold true for the other three quadrants.

Figure 3:
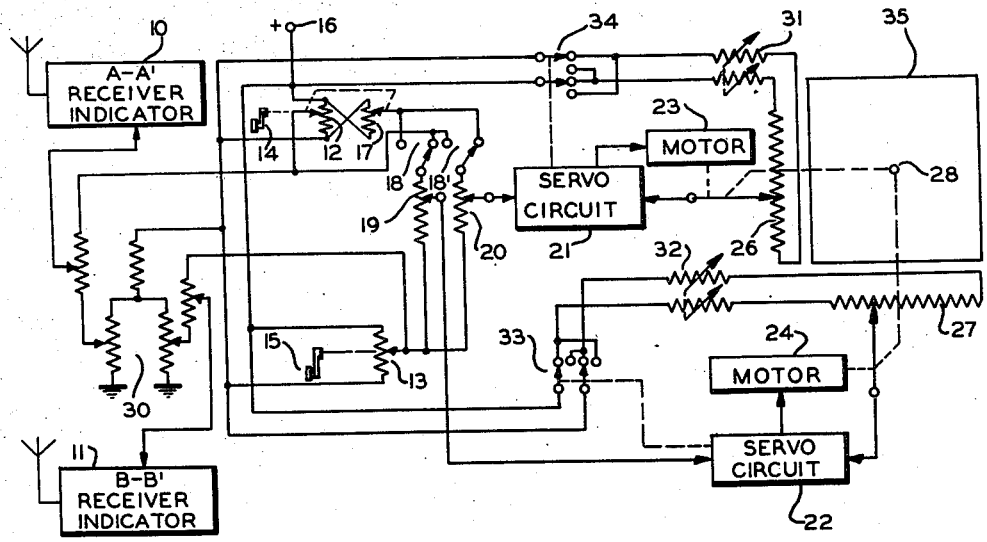
Fig. 3 is generally a circuit diagram of an embodiment of the invention.
Figure 4:
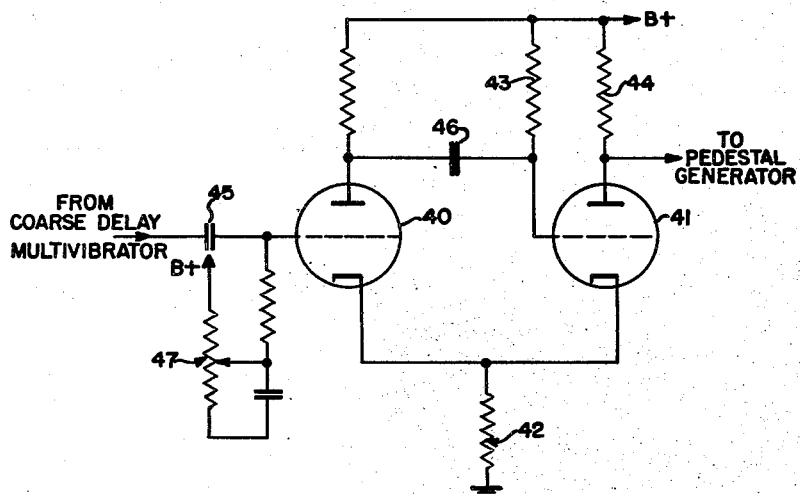
Fig. 4 is a circuit diagram of the fine delay multivibrator of the long range navigation system disclosed in the aforesaid copending application Serial No. 599,163.
Figure 5:
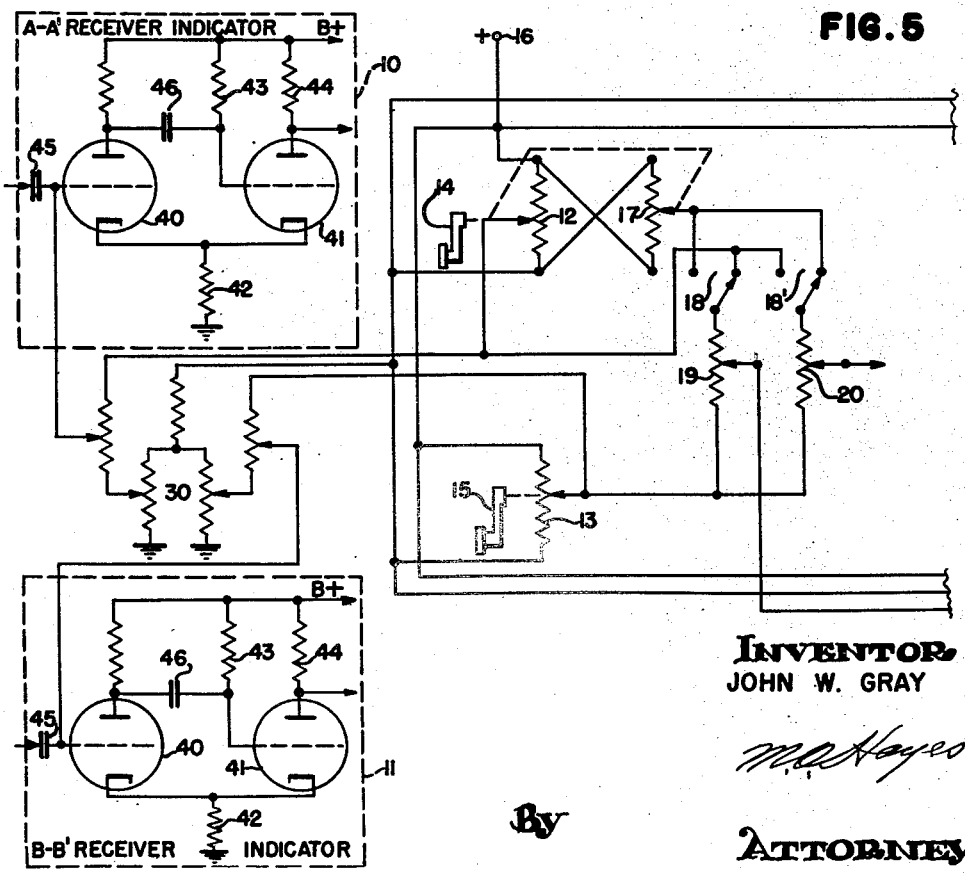
Fig. 5 is a circuit diagram illustrating the connections of the circuit of Fig. 3 to the fine delay multivibrator circuit of the long range navigation receivers.

In Figs. 3 and 5, the A—A' and B—B' long range navigation receiver-indicators are represented by blocks 10 and 11. Each of the receivers includes in its time differential measuring circuit a fine delay multivibrator preferably of the type shown in Fig. 4 and further illustrated in circuit with the present invention in Fig. 5. The multivibrator is of the familiar bias control type which is capable of producing an accurately known variable time duration pulse and consists of a pair of triode vacuum tubes 40 and 41, which have their cathodes connected to ground through a common cathode resistance 42. Tube 41 has its grid returned to B+ through resistance 43 so that it is normally held conducting. The plate resistance 44 is then made of such a value that the current passing through tube 41 and cathode resistor 42 is of such a value as to bias tube 40 to cut off by virtue of the voltage drop across cathode resistor 42. In the operation of the circuit, the trailing edge of the output of the coarse delay multivibrator is differentiated and applied through condenser 45 as a positive pulse to the grid of tube 40, thereby rendering tube 40 conducting and hence dropping its plate voltage. The drop in plate voltage is then transferred through condenser 46 to the grid of tube 41 to cut off current flow through the latter. Thereafter, condenser 46 begins to charge exponentially through resistance 43 to correspondingly raise the grid voltage of tube 41 until condenser 46 has charged to a point to approach the cathode voltage developed across resistance 42 and hence render tube 41 conducting again. It will be observed that the current passed by tube 40 when it is conducting will depend upon the bias applied to its grid which determines the voltage developed across cathode resistor 42 and hence the amount of charge condenser 46 has to accrue before it may overcome the cut-off bias across the cathode resistor. Therefore the bias control for tube 40, potentiometer 47, determines the length of time that tube 41 is held nonconducting and thus the time duration of the positive pulse produced on its plate. The more positive the grid bias on tube 40 the longer will be the pulse output from tube 41. As previously mentioned, the circuit constants of this multivibrator are so selected as to generate a voltage pulse which is continuously variable from 200 to 700 microseconds' duration. The trailing edge of the output pulses are then utilized to time the sweep for the "slave" transmitter pulse, and thus the voltage on potentiometer 47 serves as a fine timing indication of the difference in time of arrival of the "master" and "slave" pulses. As shown in Fig. 5, each of the A—A' and B—B' receiver-indicators has such a fine delay multivibrator incorporated therein for use as a time measuring device. The only change that is necessary in the receiver-indicators to incorporate them in the present invention is to remove the potentiometers 47 from each of the circuits and apply instead to the grid of tube 40 of the A—A' and B—B' multivibrators the potentials at the arms of potentiometers 12 and 13, respectively, each of these potentiometers having a voltage range similar to potentiometer 47. Cranks 14 and 15 are provided for moving the arms of the respective potentiometers 12 and 13 whereby the grid potentials of the multivibrators may be adjusted to maintain the pulses from corresponding "master" and "slave" stations superimposed on the visual indicator. A source of direct voltage is applied at terminal 16 to be used as the biasing potential on these grids. It is thus apparent that the receiver-indicators are operated in their normal manner.

A second potentiometer 17 has its resistance coil connected across the resistance coil of potentiometer 12, and its arm mechanically linked with the arm potentiometer 12 to produce a voltage change at its arm of a magnitude equal and opposite to that produced by a corresponding change of the arm of potentiometer 12. Coordinate conversion potentiometers 19 and 20 have their resistance coils connected at one end of each to the arm of potentiometer 13, and the other ends of these resistance coils are connected to the arms of potentiometers 12 and 17 for the position of switches 18 and 18' as shown. With switches 18 and 18' in the opposite position from shown the connections to the respective arms of potentiometers 12 and 13 are reversed. The settings of the arms of potentiometers 19 and 20 pick off voltages which are proportional to the voltages applied to the grids of the delay multivibrators as determined by the settings of the cranks 14 and 15, which are utilized to establish the horizontal and vertical coordinates of plotting board 35. Thus, these potentiometers feed two resultant voltages to servo circuits 21 and 22 depending on the adjustment of cranks 14 and 15. Servo circuits 21 and 22 with their associated motors 23 and 24 respectively, move the respective arms of potentiometers 26 and 27 in response to the voltages applied to these servo circuits.

These servo circuits are old in the art, and detailed description is unnecessary. Broadly, they each comprise a differential amplifier fed by the voltages from corresponding arms of potentiometers 19 and 20, and 26 and 27. The output voltages from the differential amplifier after further amplification are used to control the grid bias of two thyratrons which are fed by alternating voltages applied in phase opposition to each thyratron. The plate circuits of the thyratrons are in the path of the motor armature. Consequently, a current will flow through the motor armature depending on the relative voltage levels applied to the differential amplifier. The motor being mechanically linked with the arm of the corresponding potentiometers 26 or 27 will rotate to equalize these voltage levels. A stylus 28 is mechanically linked with the arms of potentiometers 26 and 27 to move either horizontally or vertically over the surface of board 35 with the movement of these arms, the net movement being the resultant of the movement of both arms.

In operation, resistance networks 30, 31, and 32 are adjusted to calibrate the circuit over the operating range. Resistance network 30 is used to calibrate the extremities of the range, while networks 31 and 32 are used to calibrate the intervening portion. The Iso A lines may run north of east or south of east, and as the ship moves easterly along one of them, the delay multivibrator voltage $E_B$ may be increasing or decreasing. Similarly, the B Iso lines may run east of north or west of north, and as the ship moves northerly along one of them, the delay multivibrator voltage $E_A$ may be increasing or decreasing. In order to insure the stylus moving in the proper direction without changing the direction of the board's coordinates regardless of the direction of voltage change of $E_A$ and $E_B$ with movement along the Iso lines, switches 18, 18', 33 and 34 have been provided. It is to be noted that switches 33 and 34 are linked to their corresponding servo circuits 22 and 21 to reverse the effective direction of the incremental current through the motors in response to the incremental voltage output of the differential amplifiers. There are four independently operable switches in all, and these four switches in proper position will insure movement of the stylus to correspond to any direction of the Iso lines and of the change in voltage $E_A$ and $E_B$.

This application is only to be limited by the appended claims.

What is claimed is:

1. Apparatus for plotting the course of a craft on which said apparatus is mounted, comprising, in combination, two long range navigation receiver-indicators each of which includes a delay multivibrator in which adjustment of the grid voltage of one tube of each functions to superimpose corresponding pulses from respective pairs of stationary transmitters on its visual indicator, the magnitude of the grid voltage being a measure of the time difference in arrival time of the pulses of the respective pairs, a pair of potentiometers for respectively adjusting the voltages on the grids of said multivibrator to maintain said received pulses superimposed on said indicator, a plotting board having two potentiometers whose arms are respectively movable in a horizontal and vertical direction on said board, motors and associated servo circuits for moving each of said potentiometer arms to position depending on the magnitude of the input voltage to each of said servo circuits, means to apply a voltage to each of said servo circuits which is proportional to the voltages appearing at the grids of said multivibrators, means coupling the voltage of said plotting board potentiometers to its respective servo circuit, and a stylus movable with each of said arms to move as the resultant of the motions of said arms.

2. Apparatus for plotting the course of a moving craft on which said apparatus is mounted, comprising, in combination, two long range navigation receiver-indicators each of which includes a delay multivibrator in which adjustment of the grid voltage of one tube of each functions to superimpose corresponding pulses from respective pairs of stationary transmitters on its visual indicator, a pair of potentiometers for respectively adjusting said grid voltages, and a plotting board having a stylus movable in response to said voltages.

3. Apparatus for plotting the course of a moving craft on which said apparatus is mounted, comprising, in combination, two long range navigation receiver-indicators each of which includes a delay multivibrator in which adjustment of the grid voltage of one tube of each functions to superimpose corresponding pulses from respective pairs of stationary transmitters on its visual indicator, a pair of potentiometers for respectively adjusting said voltages to maintain the aforesaid pulses superimposed, a plotting board having potentiometers whose arms are respectively movable in horizontal and vertical directions on said board, a stylus movable with each of said arms to move as the resultant movement of said arms, motors and associated servo circuits for moving each of said potentiometer arms to a position depending on the magnitude of the grid voltages of said multivibrator, and means coupling the voltages of said potentiometer arms to their respective servo circuits.

4. Apparatus for plotting the course of a moving craft on which said apparatus is mounted, comprising, in combination, two long range navigation receiver-indicators each of which includes means responsive to an adjustable voltage to superimpose corresponding pulses from respective pairs of stationary transmitters on its visual indicator, a plotting board having first and second potentiometers whose arms are movable respectively in horizontal and vertical directions on said board, motors and associated servo circuits for moving each of said potentiometer arms to a position depending on the magnitude of the input voltage to each of said servo circuits, means coupling the voltages of said potentiometer arms to their respective servo circuits, and means for feeding a voltage to each of said servo circuits proportional to the aforesaid adjustable voltages.

JOHN W. GRAY.

REFERENCES CITED

The following references are of record in the file of this patent:

UNITED STATES PATENTS

| Number | Name | Date |
| --- | --- | --- |
| 2,043,336 | Sjostrand | June 9, 1936 |
| 2,332,523 | Norden et al. | Oct. 26, 1943 |
| 2,391,633 | Korn et al. | Dec. 25, 1945 |
| 2,395,351 | Sohn | Feb. 19, 1946 |